US010975839B2

(12) United States Patent
Fortner (10) Patent No.: US 10,975,839 B2
(45) Date of Patent: Apr. 13, 2021

(54) VERTICAL AXIS WIND TURBINES WITH V-CUP SHAPED VANES, MULTI-TURBINE ASSEMBLIES AND RELATED METHODS AND SYSTEMS

(71) Applicant: William Olen Fortner, Gillette, WY (US)

(72) Inventor: William Olen Fortner, Gillette, WY (US)

( * ) Notice: Subject to any disclaimer, the term of this patent is extended or adjusted under 35 U.S.C. 154(b) by 0 days.

(21) Appl. No.: 16/410,427

(22) Filed: May 13, 2019

(65) Prior Publication Data

US 2019/0360458 A1 Nov. 28, 2019

Related U.S. Application Data

(60) Provisional application No. 62/675,304, filed on May 23, 2018.

(51) Int. Cl.
*F03D 3/00* (2006.01)
*F03D 9/25* (2016.01)
*F03D 3/06* (2006.01)

(52) U.S. Cl.
CPC ............. *F03D 3/005* (2013.01); *F03D 3/061* (2013.01); *F03D 9/25* (2016.05); *F05B 2240/211* (2013.01); *F05B 2240/30* (2013.01)

(58) Field of Classification Search
CPC ........ F03D 3/005; F03D 9/25; F05B 2240/30; Y02E 10/74
See application file for complete search history.

(56) References Cited

U.S. PATENT DOCUMENTS

| 223,308 | A | * | 1/1880 | Barker | .......................... 416/119 |
| 259,563 | A | * | 6/1882 | Lowther | ............... B64C 11/346 |
| | | | | | 416/139 |
| 294,943 | A | * | 3/1884 | White | ............................ 416/50 |

(Continued)

FOREIGN PATENT DOCUMENTS

| EP | 2039927 A1 * | 3/2009 | ............. F03D 80/00 |
| GB | 2484109 A * | 4/2012 | ............. F03D 3/005 |

(Continued)

*Primary Examiner* — Ninh H. Nguyen
*Assistant Examiner* — Brian Christopher Delrue
(74) *Attorney, Agent, or Firm* — Bretton L. Crockett; TechLaw Ventures, PLLC (57) ABSTRACT

Vertical axis windmill turbine assemblies, as well as methods, systems and components related thereto. In one illustrative embodiment, a central shaft is supported by upper and lower bearings allowing it to rotate. Upper and lower support plates are disposed on the central shaft and support a plurality of vanes that extend therebetween. Each vane may have a closed leeward side formed from at least two planar members that join at a central ridge and an open windward side. Generators may be operatively connected to the central shaft at the lower end and the upper end. Multiple vertical axis assemblies may be disposed on a planar platform. Where multiple assemblies are present, they may be positioned to optimize production based on prevailing wind directions and may include windmill and turbine assemblies optimized for different wind conditions. In some systems, the assemblies may be disposed in a linear array.

19 Claims, 3 Drawing Sheets

(56) References Cited

U.S. PATENT DOCUMENTS

| | | | | |
|---|---|---|---|---|
| 303,585 A * | 8/1884 | Morehouse | F03B 1/02 | 416/197 R |
| 387,102 A * | 7/1888 | Nagel | B64C 11/24 | 416/91 |
| 574,411 A * | 1/1897 | Gassett | F03D 3/00 | 416/142 |
| 1,100,332 A * | 6/1914 | Smith | F04D 29/281 | 416/175 |
| 1,334,485 A * | 3/1920 | Clipfell | F03D 7/0224 | 290/55 |
| 1,359,180 A * | 11/1920 | Levesque | F03D 3/065 | 416/91 |
| 1,413,861 A * | 4/1922 | McDowell | F03D 7/06 | 415/34 |
| 1,466,026 A * | 8/1923 | Manning | F03D 3/065 | 416/32 |
| 1,485,649 A * | 3/1924 | Van Leggelo | B64C 11/006 | 416/183 |
| 1,619,643 A * | 3/1927 | Webb | F03D 80/70 | 415/164 |
| 1,645,855 A * | 10/1927 | De Vore | F03D 3/0409 | 415/64 |
| 1,697,574 A * | 1/1929 | Savonius | F03D 3/007 | 416/110 |
| 1,812,741 A * | 6/1931 | Espinosa | F03D 15/10 | 415/4.4 |
| 2,252,788 A * | 8/1941 | Sparr | F03B 3/125 | 416/197 R |
| 2,518,611 A * | 8/1950 | Geiger | G01P 5/06 | 416/197 R |
| 3,918,839 A * | 11/1975 | Blackwell | F03D 3/065 | 416/175 |
| 3,930,750 A * | 1/1976 | Schultz | F03D 3/065 | 416/197 A |
| 4,015,911 A * | 4/1977 | Darvishian | F03D 3/067 | 416/119 |
| 4,177,014 A * | 12/1979 | Kephart, Jr. | F03D 3/065 | 416/197 A |
| 4,191,507 A * | 3/1980 | Deberg | F03D 3/067 | 416/117 |
| 4,236,504 A * | 12/1980 | Cornelison, Jr. | F03D 7/06 | 126/247 |
| 4,260,325 A * | 4/1981 | Cymara | F03D 3/0481 | 415/4.4 |
| 4,329,593 A * | 5/1982 | Willmouth | F03D 3/065 | 290/44 |
| 4,364,709 A * | 12/1982 | Tornquist | F03D 3/061 | 416/132 B |
| 4,383,801 A * | 5/1983 | Pryor | F03D 3/068 | 416/119 |
| 4,415,814 A * | 11/1983 | Martinez | F03D 9/25 | 290/55 |
| 4,551,631 A * | 11/1985 | Trigilio | F03D 3/0409 | 290/55 |
| 4,650,403 A * | 3/1987 | Takacs | F03D 3/065 | 416/196 A |
| 4,684,817 A * | 8/1987 | Goldwater | F03D 3/067 | 290/55 |
| 4,718,822 A * | 1/1988 | Riezinstein | F03D 7/06 | 416/119 |
| 4,872,804 A * | 10/1989 | Teles De Menezes, Jr. | F03D 3/0463 | 415/2.1 |
| 4,935,639 A * | 6/1990 | Yeh | F03D 1/04 | 290/55 |
| 5,252,029 A * | 10/1993 | Barnes | F03D 13/20 | 416/142 |
| 5,277,550 A * | 1/1994 | Kato | B01F 7/0025 | 416/194 |
| 5,336,933 A * | 8/1994 | Ernster | F03D 3/005 | 290/44 |
| 5,505,416 A * | 4/1996 | Dodge | H02G 3/263 | 248/230.5 |
| 5,808,369 A * | 9/1998 | Whelan | F03D 3/067 | 290/44 |
| 6,191,496 B1 * | 2/2001 | Elder | F03D 3/0436 | 290/55 |
| 6,345,957 B1 * | 2/2002 | Szpur | F03D 3/065 | 416/197 A |
| 6,448,669 B1 * | 9/2002 | Elder | F03D 3/0436 | 290/54 |
| 6,465,899 B2 * | 10/2002 | Roberts | F03D 3/0427 | 290/44 |
| 6,740,989 B2 * | 5/2004 | Rowe | F03D 9/25 | 290/55 |
| 6,798,082 B1 * | 9/2004 | Chen | F03D 3/005 | 290/55 |
| 6,808,366 B2 * | 10/2004 | Sikes | F03D 3/02 | 416/1 |
| 6,948,905 B2 * | 9/2005 | Horjus | F03D 3/02 | 415/4.2 |
| 6,981,839 B2 * | 1/2006 | Fan | F03D 3/0427 | 415/4.1 |
| 7,008,171 B1 * | 3/2006 | Whitworth | H02S 10/12 | 415/4.2 |
| 7,056,082 B1 * | 6/2006 | Taylor | F03D 3/02 | 415/4.2 |
| 7,132,760 B2 * | 11/2006 | Becker | F03D 3/002 | 290/55 |
| 7,241,105 B1 * | 7/2007 | Vanderhye | B63H 13/00 | 415/4.2 |
| 7,267,530 B2 * | 9/2007 | McCabe | F04B 17/02 | 416/196 A |
| 7,287,954 B2 * | 10/2007 | Kinkaid | F03D 3/061 | 415/4.2 |
| 7,288,850 B2 * | 10/2007 | Hicks | F03D 9/11 | 290/44 |
| 7,362,004 B2 * | 4/2008 | Becker | F03D 9/25 | 290/55 |
| 7,371,135 B1 * | 5/2008 | Vanderhye | B63H 13/00 | 440/8 |
| 7,425,776 B2 * | 9/2008 | Ketcham | F03D 3/005 | 290/55 |
| 7,432,686 B2 * | 10/2008 | Erdman | H02P 9/02 | 322/44 |
| 7,488,150 B2 * | 2/2009 | Krippene | F03D 1/04 | 415/4.2 |
| 7,591,635 B2 * | 9/2009 | Ryu | F03D 3/068 | 416/111 |
| 7,744,338 B2 * | 6/2010 | DeRuyter | F03D 9/25 | 415/2.1 |
| 7,762,777 B2 * | 7/2010 | Vanderhye | F03D 3/062 | 416/132 B |
| 7,798,766 B2 * | 9/2010 | Sauer | F03D 3/065 | 415/4.2 |
| D625,261 S * | 10/2010 | Winkler | D13/115 | |
| 7,896,608 B2 * | 3/2011 | Whitworth | F03D 3/0436 | 415/4.2 |
| 7,946,802 B1 * | 5/2011 | Iskrenovic | F03D 13/20 | 415/4.2 |
| 7,969,036 B2 * | 6/2011 | Chung | F03D 9/25 | 290/55 |
| 8,002,523 B2 * | 8/2011 | Borden | F03B 13/1825 | 416/1 |
| 8,011,876 B2 * | 9/2011 | Gradwohl | F03D 3/0481 | 415/4.2 |
| 8,030,792 B2 * | 10/2011 | Haar | F03D 3/02 | 290/44 |
| 8,087,894 B2 * | 1/2012 | Brooks | F03D 80/70 | 416/117 |
| 8,096,750 B2 * | 1/2012 | McEntee | F03B 3/121 | 415/4.2 |
| 8,164,210 B2 * | 4/2012 | Boone | F03D 3/005 | 290/55 |
| 8,177,481 B2 * | 5/2012 | Liang | F03D 3/067 | 415/4.2 |

(56) References Cited

U.S. PATENT DOCUMENTS

| | | | | |
|---|---|---|---|---|
| 8,210,817 B2* | 7/2012 | Iskrenovic | ............ | F03D 3/0418 416/197 A |
| 8,232,664 B2* | 7/2012 | Stroup | ...................... | H02P 9/04 290/55 |
| 8,446,028 B2* | 5/2013 | Chung | .................... | F03D 3/005 290/44 |
| 8,556,571 B2* | 10/2013 | Cassidy | .................... | F03D 5/00 415/4.3 |
| D698,727 S * | 2/2014 | Steel | ............................ | D13/115 |
| 8,698,340 B2* | 4/2014 | Hu | .......................... | F03D 3/062 290/55 |
| 8,772,959 B2* | 7/2014 | Lee | ......................... | F03D 80/60 290/55 |
| 8,840,360 B2* | 9/2014 | Quintal | ................. | F03D 3/0436 415/4.1 |
| 8,864,440 B2* | 10/2014 | Sauer, Jr. | .................. | F03D 3/02 415/4.2 |
| 8,899,925 B2* | 12/2014 | Tamatsu | ................ | F03B 17/065 416/119 |
| 8,899,937 B2* | 12/2014 | Graham | ................ | F03D 7/0268 416/231 R |
| 8,905,704 B2* | 12/2014 | Sauer | ...................... | F03D 3/065 415/4.2 |
| 9,011,096 B2* | 4/2015 | Su | ............................. | F03D 3/02 416/111 |
| 9,024,463 B2* | 5/2015 | Boone | ..................... | F03D 3/005 290/55 |
| 9,103,321 B1* | 8/2015 | Bardia | .................... | F03D 80/70 |
| 9,140,236 B2* | 9/2015 | Iskrenovic | ............ | F03D 3/0418 |
| 9,243,611 B2* | 1/2016 | Song | ........................ | F03D 3/061 |
| 9,284,945 B2* | 3/2016 | Brendle | ................. | F03D 3/061 |
| 9,482,204 B2* | 11/2016 | Plourde | ................. | F03D 3/061 |
| 9,500,180 B1* | 11/2016 | Chandler | ............... | F03D 7/0268 |
| 9,677,539 B2* | 6/2017 | Tamatsu | ................. | F03D 3/068 |
| 9,695,801 B1* | 7/2017 | Shoffler | ................. | F03D 3/005 |
| 9,695,803 B2* | 7/2017 | Kang | ....................... | F03D 3/04 |
| 9,714,640 B2* | 7/2017 | Chambers | ............... | F03D 3/062 |
| 9,739,153 B2* | 8/2017 | Behrens | ................... | F01D 5/14 |
| 9,859,839 B2* | 1/2018 | Pugina | .................... | F03D 13/22 |
| 9,863,394 B2* | 1/2018 | Behrens | ................... | F03D 3/062 |
| 10,138,874 B2* | 11/2018 | Angoli | .................... | F03D 13/20 |
| 10,145,358 B2* | 12/2018 | Joosten | ................... | F03D 3/068 |
| 10,173,663 B1* | 1/2019 | Combs | ..................... | B60L 53/55 |
| 10,305,414 B2* | 5/2019 | Sanese | ................ | H01L 31/0547 |
| 10,316,824 B2* | 6/2019 | Watkins | ................. | F03D 3/067 |
| 10,378,510 B2* | 8/2019 | Margolis | ................ | F03D 3/061 |
| 10,400,746 B1* | 9/2019 | Shoffler | ................ | F03D 3/0409 |
| 2002/0109358 A1* | 8/2002 | Roberts | ................ | F03D 3/0409 290/54 |
| 2004/0113431 A1* | 6/2004 | Huang | .................... | F03D 3/0427 290/55 |
| 2005/0025624 A1* | 2/2005 | Pierson | .................. | F03D 3/065 416/197 A |
| 2005/0169742 A1* | 8/2005 | Kane | ....................... | F03D 13/22 415/4.4 |
| 2006/0026954 A1* | 2/2006 | Truong | .................... | F03D 3/02 60/398 |
| 2006/0257240 A1* | 11/2006 | Naskali | .................. | F03D 3/064 415/4.4 |
| 2006/0275105 A1* | 12/2006 | Roberts | ................ | F03D 3/0409 415/4.2 |
| 2007/0018462 A1* | 1/2007 | Richards | ............... | F03D 3/0427 290/55 |
| 2007/0269312 A1* | 11/2007 | Hsu | ........................ | F03D 80/00 416/186 R |
| 2008/0047270 A1* | 2/2008 | Gilbert | ................... | F03D 9/007 60/641.12 |
| 2008/0095631 A1* | 4/2008 | Bertony | ................... | F03D 3/02 416/197 A |
| 2008/0152492 A1* | 6/2008 | Fein | ......................... | F03D 9/11 416/9 |
| 2008/0187432 A1* | 8/2008 | Cowan | ................... | F03D 3/005 415/4.4 |
| 2008/0217924 A1* | 9/2008 | Boone | .................... | F03D 3/067 290/55 |
| 2008/0217925 A1* | 9/2008 | Boone | .................... | F03D 9/28 290/55 |
| 2008/0258468 A1* | 10/2008 | Fuller | .................... | F03D 3/062 290/55 |
| 2009/0066090 A1* | 3/2009 | Boone | .................... | F03D 3/065 290/55 |
| 2009/0180880 A1* | 7/2009 | Ersoy | ...................... | F03D 3/067 416/132 R |
| 2009/0184521 A1* | 7/2009 | Chong | .................. | F03D 3/0463 290/55 |
| 2009/0243302 A1* | 10/2009 | Eisenblaetter | ........ | F03D 3/0454 290/55 |
| 2009/0317251 A1* | 12/2009 | Tsou | ....................... | F03D 80/80 416/51 |
| 2009/0317255 A1* | 12/2009 | Bertony | .................. | F03D 3/061 416/198 R |
| 2010/0194251 A1* | 8/2010 | Sikes | ...................... | F03D 3/065 310/68 D |
| 2010/0230974 A1* | 9/2010 | Cantwell | .................. | F03D 9/25 290/55 |
| 2010/0233919 A1* | 9/2010 | Ersoy | ..................... | F03D 3/005 440/8 |
| 2010/0254808 A1* | 10/2010 | Kim | ...................... | F03D 3/0409 415/208.1 |
| 2010/0270804 A1* | 10/2010 | Datel | ....................... | F24F 7/02 290/55 |
| 2010/0295316 A1* | 11/2010 | Grassman | .............. | H02K 21/24 290/55 |
| 2010/0296913 A1* | 11/2010 | Lee | .......................... | F03D 3/04 415/4.2 |
| 2010/0296944 A1* | 11/2010 | Caputi | .................... | F03D 13/10 416/93 R |
| 2011/0064576 A1* | 3/2011 | Liu | .......................... | F03D 5/06 416/82 |
| 2011/0089698 A1* | 4/2011 | Ahmadi | .................. | H02S 10/10 290/55 |
| 2011/0107684 A1* | 5/2011 | Flores | .................... | F03D 13/20 52/29 |
| 2011/0148116 A1* | 6/2011 | Halstead | ................. | F03D 3/02 290/52 |
| 2011/0221202 A1* | 9/2011 | Bernhoff | ................. | F03D 3/064 290/55 |
| 2011/0280708 A1* | 11/2011 | Cochrane | ................ | F03D 3/065 415/4.4 |
| 2012/0099997 A1* | 4/2012 | Song | ....................... | F03D 3/065 416/210 R |
| 2012/0175883 A1* | 7/2012 | Nica | ....................... | F03D 3/0409 290/55 |
| 2012/0195763 A1* | 8/2012 | Bolelli | .................. | F03B 17/063 416/223 R |
| 2013/0017083 A1* | 1/2013 | Graham | ................. | F03D 7/0268 416/1 |
| 2013/0224039 A1* | 8/2013 | Moser | .................... | F03D 3/061 416/242 |
| 2014/0023500 A1* | 1/2014 | Rubio | .................... | F03D 3/0427 416/24 |
| 2014/0105743 A1* | 4/2014 | Bassett | .................... | F03D 3/02 416/126 |
| 2015/0159630 A1* | 6/2015 | Haskell | ................... | F03D 3/065 290/55 |
| 2015/0322920 A1* | 11/2015 | Jones | ...................... | F03D 3/02 416/1 |
| 2017/0211544 A1* | 7/2017 | Olivera | ................... | F03D 3/068 |
| 2017/0234303 A1* | 8/2017 | Jones | ...................... | F03D 9/11 290/55 |
| 2018/0038344 A1* | 2/2018 | Elayyan | .................. | F03D 9/25 |
| 2018/0038345 A1* | 2/2018 | DeRuyter | .............. | F03D 3/0454 |
| 2018/0258911 A1* | 9/2018 | Ireland | ................... | F03D 3/061 |
| 2018/0269823 A1* | 9/2018 | Borba | .................... | F03D 3/061 |
| 2019/0040845 A1* | 2/2019 | Potter | .................... | F03D 13/35 |
| 2019/0128241 A1* | 5/2019 | Achard | ................... | H02K 7/102 |
| 2019/0195194 A1* | 6/2019 | Vaz | .......................... | F03D 3/062 |
| 2019/0257286 A1* | 8/2019 | Li | ........................... | F03D 13/25 |

(56) References Cited

U.S. PATENT DOCUMENTS

| | | | | |
|---|---|---|---|---|
| 2019/0360458 A1* | 11/2019 | Fortner | ............... | F03D 3/005 |
| 2019/0376488 A1* | 12/2019 | Oslin | ................. | F03D 3/005 |
| 2020/0191114 A1* | 6/2020 | Leon Martinez | ....... | F03D 3/005 |

FOREIGN PATENT DOCUMENTS

| | | | | |
|---|---|---|---|---|
| JP | 2012137039 A | * | 7/2012 | |
| WO | WO-2007027113 A1 | * | 3/2007 | ............ F03D 9/34 |

* cited by examiner

VERTICAL AXIS WIND TURBINES WITH V-CUP SHAPED VANES, MULTI-TURBINE ASSEMBLIES AND RELATED METHODS AND SYSTEMS

CROSS-REFERENCE TO RELATED APPLICATION

This application claims the benefit of U.S. Provisional Application No. 62/675,304, filed May 23, 2018, which is hereby incorporated by reference herein in its entirety, including but not limited to those portions that specifically appear hereinafter.

TECHNICAL FIELD

The present disclosure relates to systems and methods for wind power turbines.

BACKGROUND

A number of different mounting systems for windmills and wind powered turbines for electrical generation have been tried over the years. However, most of these have wither been a single tower or pool with a single windmill head for residential or agricultural use, or are part of large commercial installations, used for generating power on a large scale. Additionally, while vertical axis windmills are known, these are often elaborate constructions, that are unable to be placed near one another in an array using a single simple support structure or are unable to support more than one generator.

A vertical axis windmill system of simple construction that was capable of supporting multiple generators in a single construction would be an improvement in the art. The ability to mount multiple such vertical axis windmill systems on a single platform structure at a single installation would be a further improvement in the art.

SUMMARY

The present disclosure includes a vertical axis windmill turbine assembly, as well as methods, systems and components related thereto. In one illustrative embodiment, a central shaft is supported by upper and lower bearings allowing it to rotate. Upper and lower support plates are disposed on the central shaft and support a plurality of vanes that extend therebetween. Each vane may have a V-cup shape with a closed leeward side formed from at least two planar members that join at a central ridge and an open windward side. Generators may be operatively connected to the central shaft at the lower end and the upper end.

Multiple vertical axis assemblies may be disposed on a planar platform. In some systems tiered platforms, each constructed to support a plurality of wind turbine assemblies may be used. Where multiple assemblies are present, they may be positioned to optimize production based on prevailing wind directions and may include windmill and turbine assemblies optimized for different wind conditions. In some systems, the assemblies may be disposed in a linear array.

DESCRIPTION OF THE DRAWINGS

It will be appreciated by those of ordinary skill in the art that the various drawings are for illustrative purposes only. The nature of the present disclosure, as well as other embodiments of the present invention, may be more clearly understood by reference to the following detailed description, to the appended claims, and to the several drawings.

DETAILED DESCRIPTION

The present disclosure relates to apparatus, systems and method for wind turbine assemblies and for the supporting and positioning wind turbines. It will be appreciated by those skilled in the art that the embodiments herein described, while illustrating certain embodiments, are not intended to so limit the disclosure or the scope of the invention. Those skilled in the art will also understand that various combinations or modifications of the embodiments presented herein can be made without departing from the scope of this disclosure. All such alternate embodiments are within the scope of the present invention.

Figure 1A:
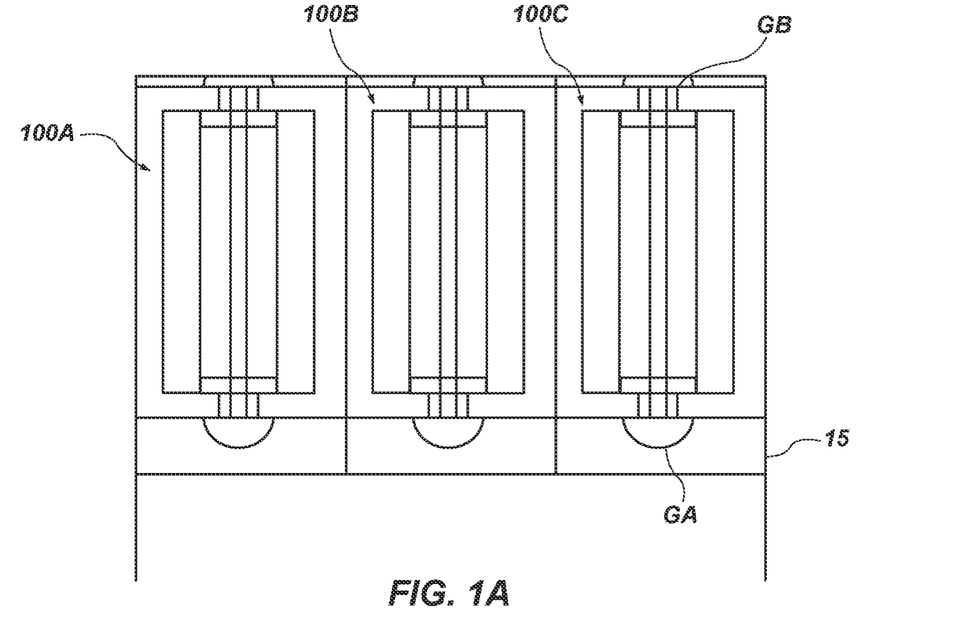
FIGS. 1A, 1B and 1C are side, top, and bottom views, respectively of a multiple wind turbine assembly system in accordance with one aspect of the present disclosure.
Figure 1B:
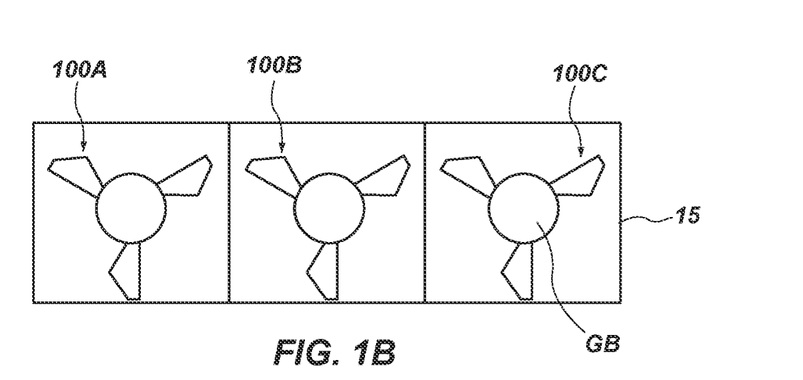
Figure 1C:
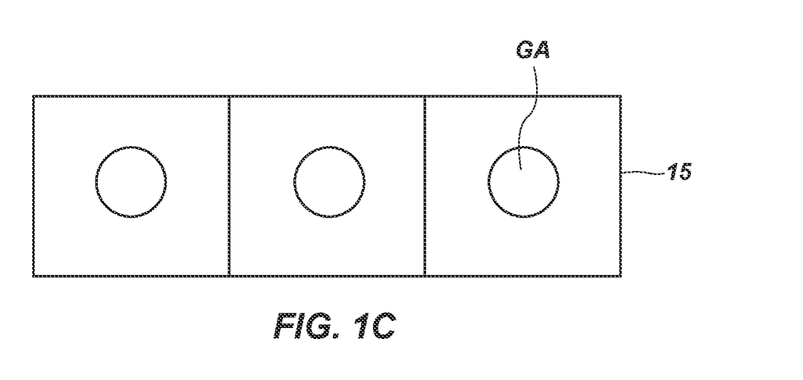

Referring to FIGS. 1A, 1B and 1C, multiple vertical axis assemblies 100A, 100B and 100C are depicted disposed on a planar platform 15. As depicted, the three assemblies 100 are linear with respect to one another on the platform 15. The platform 15 may be a framework that supports the assemblies as a desired height. The platform may be disposed at a desired height on a suitable support, such as plurality of legs that are attached to a sufficient foundation structure(s). The desired height may vary depending on the wind conditions at a particular location, allowing for installation to vary in order to maximize generation or achieve acceptable efficiency at a particular location.

In some embodiments, the platform 15 may have multiple tiers for supporting one or more assemblies on different levels. Some suitable platforms may include those disclosed in Applicant's co-pending U.S. patent application Ser. No. 15/969395 filed May 2, 2018 and entitled MULTI-TURBINE PLATFORM TOWER ASSEMBLY AND RELATED METHODS SYSTEMS, AND APPARATUS, which is incorporated herein by reference in its entirety. It will be appreciated that where multiple assemblies are present on a single platform 15, they may be positioned to optimize production based on prevailing wind directions and may include windmill and turbine assemblies optimized for different wind conditions.

Figure 2A:
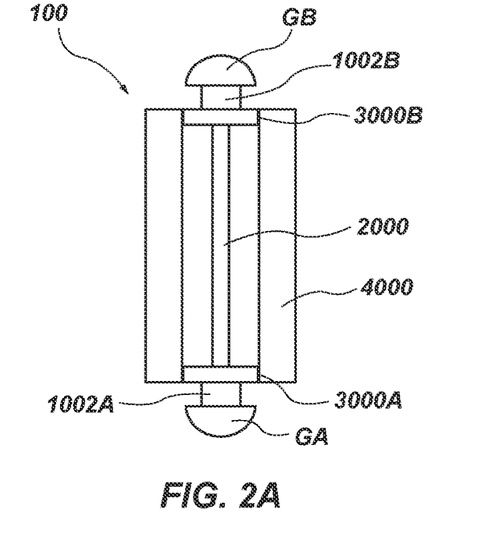
FIG. 2A is a side schematic view of a single wind turbine assembly of the system of FIGS. 1A-1C.
Figure 2B:
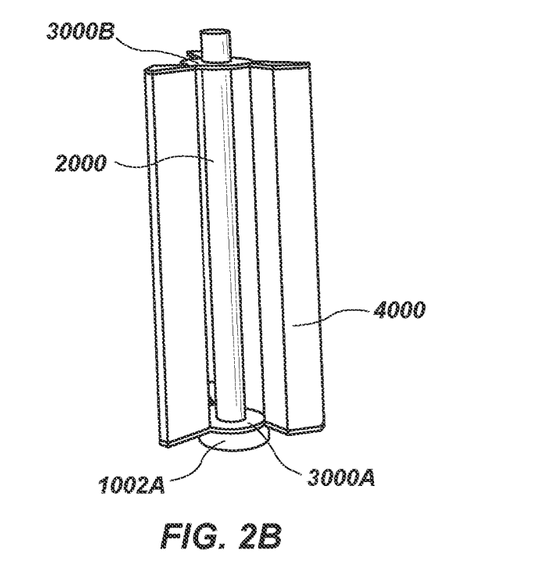
FIG. 2B is a side perspective view of an assembly of some of the components of a first illustrative embodiment of a wind turbine assembly in accordance with one aspect of the present disclosure.

Turning to FIGS. 2A and 2B, the details of single wind turbine assembly of 100 are depicted. Similar structures in the two depicted embodiments are numbered using like reference numerals for clarity. In the illustrative depicted embodiments, a central shaft 2000 is supported by an upper bearing 10028 and a lower bearing 1002A which allow it to rotate. The central shaft 2000 thus may serve as an axle for the windmill assembly 100. In the depicted embodiments, upper and lower bearings 10028 and 1002A may be rotary bearings that retain the shaft in place and allow it to rotate and through which the shaft 2000 extends. It will be appreciated that in other embodiments, the length of the shaft and the extension through the bearings may vary.

A lower bearing plate 3000A and a counterpart upper bearing plate 3000B are disposed on the shaft 2000 internal to the lower and upper bearings. One illustrative example of a suitable bearing plate 3000 is depicted in isolation in FIG. 3. A central body 3002 may have planar upper and lower surfaces and a central aperture 3004 that allows the central shaft to pass therethrough. The plate body 3004 may then be attached to the shaft 2000, as by welding.

Figure 3:
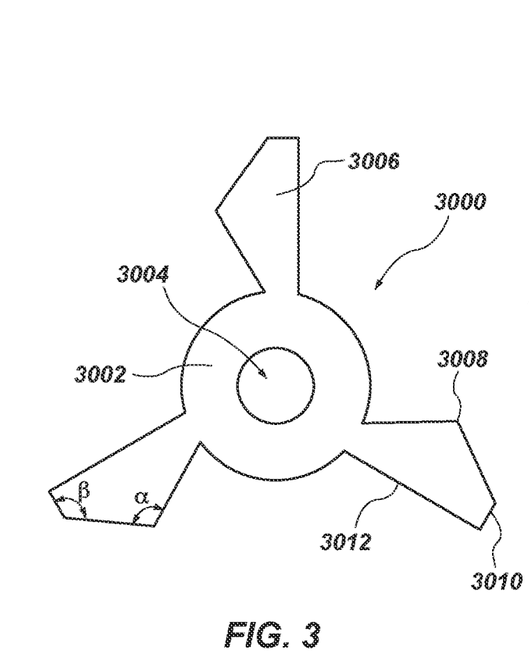
FIG. 3 is a top view bearing plate of the assembly of FIG. 2B.

A plurality of vane support members 3006 extend from the central body 3002. Each vane support member may be coplanar with the central body 3002 and may be shaped to correspond to the vanes 4000. Each vane 4000 may extend from the lower bearing plate 3000A to the upper bearing place 3000B by attachment to the respective vane support members thereof.

As depicted, the vane support member 3006 may have a trailing edge 3012 that is formed as generally straight edge, a side edge 3010 that is generally orthogonal to the trailing edge 3012 and a leading edge that has a central point 3008 at an apex of a taper to the side edge on one side and the central body on the other.

Figure 4A:
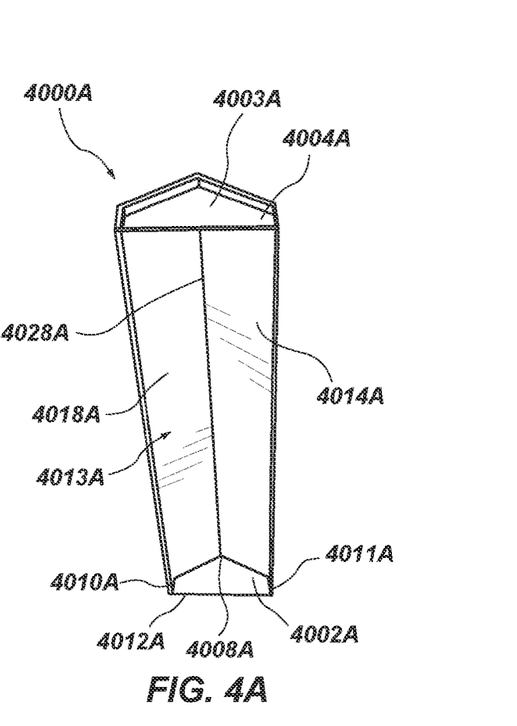
FIG. 4A is a rear perspective view of a first illustrative version of a vane for the wind turbine assembly of FIG. 2B.

One illustrative vane 4000A is depicted in isolation in FIG. 4A and may include a counterpart top plate 4003A and bottom plate 4002A that are shaped to correspond to the vane support members 3006, having trailing edge 4012A that is formed as a generally straight edge, two opposite side edges 4010A and 4011A that are generally parallel to one another and generally orthogonal to the trailing edge 4012A and a leading edge that has a central point 4008A at an apex of a taper to the side edges.

The vane 4000A may have a V-cup shape with a closed leeward side formed from with two planar members 4020A and 4022A that join at a central ridge 4028A corresponding to the apex 4008A and two side members 4018A and 4019A that extend back from the planar members and correspond to the side edges 4010A and 4011A. It will be appreciated that the planar members may be individual pieces that are joined to one another and the top plate and bottom plate by welding or may be formed as an integral piece of suitable shape, as by bending a metal sheet.

At the windward or trailing edge, 4002A, the V-cup shaped vane 4000A rear is open as depicted at 4013A. As the vane is rotated by the wind, as air pushes on the rear of the planar members through the back opening 4013A. The V-cup shaped vanes hold the wind in the windward side longer than a uncupped vane to facilitate movement. The apex ridge 4028A and tapered leading edge also assist the leeward edge in passing through the oncoming wind during that portion of rotation.

Figure 4B:
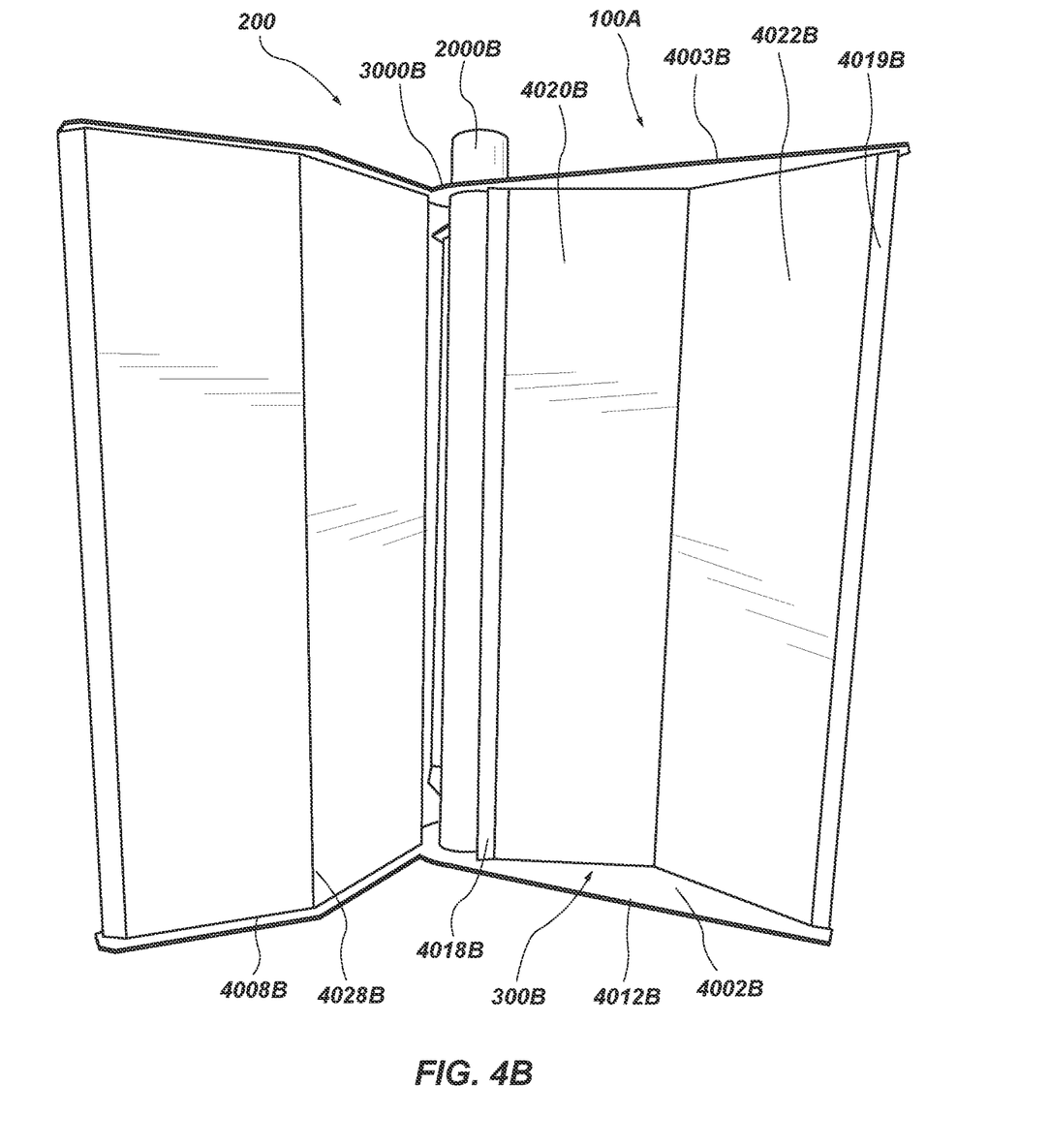
FIG. 4B is a side view of a portion of a second illustrative embodiment of a wind turbine assembly in accordance with present disclosure, depicting a second illustrative version of a vane for a wind turbine assembly.

A second illustrative vane 4000B is depicted in FIG. 4B as part of a second fan assembly 200. Unlike assembly 200, where separate upper and lower vane plates are attached to a vane support member on a bearing plate, the vane 400B is directly attached to an upper vane support member 4003B on an upper bearing plate and a lower vane support member 4002B on a lower bearing plate. Each vane support member is attached to a central portion 300B and has a trailing edge 4012B that is formed as a generally straight edge, on outer side edge 4011B that is generally orthogonal to the trailing edge 4012B and a leading edge that has a central point 4008B at an apex. The inner side edge of a taper to the side edges.

The vane 4000B may have a V-cup shape with a closed leeward side formed from with two planar members 4020B and 4022B that join at a central ridge 4028B corresponding to the apex 4008B and two side members 4018B and 4019B that extend back from the planar members. It will be appreciated that the planar members may be individual pieces that are joined to one another and the top plate and bottom plate by welding or may be formed as an integral piece of suitable shape, as by bending a metal sheet.

At the windward or trailing edge, 4002B, the V-cup shaped vane 4000B rear is open as depicted at 4013B. As the vane is rotated by the wind, as air pushes on the rear of the planar members through the back opening 4013B. The V-cup shaped vanes hold the wind in the windward side longer than an uncupped vane to facilitate movement. The apex ridge 4028B and tapered leading edge also assist the leeward edge in passing through the oncoming wind during that portion of rotation.

In the depicted vane embodiments 4000A and 4000B, the particular size of the vane components and the central ridge 4028A or 4028B or apex angle between the two leeward side members (4020A and 4022A or 4020B and 4022B) and the side angles between a side member and the attached leeward member (such as 4019B and 4022B) may be varied to achieve a desired fan rotation given the likely wind conditions at a installation site. It will be appreciated that with the generally triangular shape of the panel members and the parallel side members, that in degrees, the value of each side angle may be calculated in some embodiments by adding 90 to half of the value of the apex angle subtracted from 180. For example, in the depicted embodiment 4000A, the apex ridge may have an angle of about 90 degrees and each side angle may be about 135 degrees, and in the depicted embodiment of 4000B, the apex angle may be about 45 degrees and each side angle may be about 157.5 degrees. It will be appreciated that in various embodiments, the apex angle may vary from about 15 to about 120 degrees, but that such embodiments are illustrative and other values may be used. Additionally, where appropriate for installation, the side angle may have other arrangements, such ae tapering outwards or inwards from the front panel members.

The size of the vanes and the systems may similarly vary based on the prevailing wind conditions at the site of installation. For example, the depicted embodiment a wind turbine assembly 4000A may be about 24 inches in diameter and about 48 inches in height and wind turbine assembly 4000B may be about 42 inches in in diameter and about 48 inches in height. It will be appreciated that these are merely illustrative and that other sizes are within the scope of the present disclosure. For example, the wind turbine assembly 4000B could have any height up to about 24 feet for use with the generators discussed further herein. Additionally, the use of difference generator assemblies would allow for different sized assemblies as well.

A generator GA (FIGS. 1A and 1C) may be operatively connected to the central shaft at the lower end and rotated thereby to generate electrical power. In some embodiments, a second generator GB (FIGS. 1A and 1B) may be operatively connected to the central shaft at the upper end and rotated thereby to generate electrical power, instead of or in addition to the lower generator. The selected generator may be configured for optimal output in a selected wind condition. For example, a "higher speed" turbine assembly may be configured to operate at about 10 mph or higher wind speeds and a "lower speed" turbine assembly to operate at lower wind speeds, including about 6 mph.

The generator GA may be turned by the central shaft 2000 as the turbine assembly rotates. The average winds in most portions of the country are less than 20 mph. By using a mixture of low and high wind speed turbines in a single array on a stand 15, assemblies in accordance with the present invention allows for the generation of electricity for residential or small-scale use by wind power at locations, where this was not previously feasible. For example, the placement of each turbine on a particular platform for elevation, and the particular location on each platform allows for the turbines to be placed to capture wind from prevailing or common direction, or from any direction, and, to most efficiently use a combination of high and low windspeed turbines to obtain consistent generation.

One suitable type of generator may be the White Lightning 48V 1000 W Permanent Magnet Generator, which is commercially available from Hurricane Wind Power. Other suitable generators may include automotive alternators that generate electricity suitable for charging 12-volt batteries, or another similar electrical generating device. Other suitable alternators may include permanent magnet 12-volt DC 3-phacse alternators. Some currently commercially available examples are those offered under the names MISSOURI FREEEDOM, MISSOURI FREEDOM 2 or SKY-MAX FREEDOM, which are offered for sale by Missouri Wind and Solar. WINDZILLA mark and WINDBLUE POWER alternators commercially available from WindBlue Power of Stroh, IN may also be used.

While this disclosure has been described using certain embodiments, the present disclosure can be further modified while keeping within its spirit and scope. This application is therefore intended to cover any variations, uses, or adaptations of the disclosure using its general principles. Further, this application is intended to cover such departures from the present disclosure as come within known or customary practices in the art to which this invention pertains and which fall within the limits of the appended claims.

What is claimed is:

1. A vertical axis windmill turbine assembly, comprising
a central shaft supported by at least one upper and at least one lower bearing that allow the central shaft to rotate, the central shaft disposed in a vertical direction for operation;
an upper support plate disposed on the central shaft, the upper support plate comprising a lower central body with at least a first upper vane support member extending out therefrom;
a lower support plate disposed on the central shaft, the lower support plate comprising a lower central body with at least a first lower vane support member extending out therefrom, the at least first lower vane support member having a trailing edge formed as generally straight edge, a side edge that is orthogonal to the trailing edge and a leading edge that has a central point at an apex of a taper to the side edge on one side and the lower central body on the other;
a plurality of vanes that extend between the upper support plate and the lower support plate, each vane having a closed leeward side formed from at least two planar panel members that join at a central ridge, at least a first vane of the plurality of vanes extending between the at least first upper vane support member and the at least first lower vane support member, with the at least two planar panel members of the at least first vane aligned with the leading edge of the lower support member with the central ridge aligned with the central point of the leading edge of the lower vane support member; and
at least one generator operatively connected to the central shaft.

2. The assembly of claim 1, wherein each vane further comprises at least two planar side members, each side member joined to a side edge of a corresponding planar panel member and extending rearward to define a cup facing the windward side.

3. The assembly of claim 1, wherein the planar panel members join at the central ridge at an angle of from about 15 degrees to about 120 degrees.

4. The assembly of claim 3, wherein the planar panel members join at the central ridge at an angle of about 90 degrees and each planar side member is joined to the side edge of a corresponding planar panel member at an angle of about 135 degrees.

5. The assembly of claim 3, wherein the planar panel members join at the central ridge at an angle of about 45 degrees and each planar side member is joined to the side edge of a corresponding planar panel member at an angle of about 157.5 degrees.

6. The assembly of claim 1, wherein the plurality of vanes comprises at least three vanes.

7. The assembly of claim 2, further comprising two generators operatively connected to the central shaft, one at a lower end and the other at an upper end.

8. The assembly of claim 2, further comprising multiple vertical axis assemblies disposed on a planar platform in operative connection with multiple generators.

9. A vertical axis windmill turbine, comprising
a central shaft disposed in a vertical direction for operation;
an upper support plate comprising an upper central body with at least a first upper vane support member extending out therefrom, the at least first upper vane support member having a trailing edge formed as generally straight edge, a side edge that is orthogonal to the trailing edge and a leading edge that has a central point at an apex of a taper to the side edge on one side and the upper central body on the other;
a lower support plate comprising a lower central body with at least a first lower vane support member extending out therefrom;
at least a first vane that extends between the at least first upper vane support member and the at least first lower vane support member, the at least first vane comprising
at least two planar panel members that join one another along a first vertical edge to form a central ridge from which the panel members extend to opposite sides at a first angle, wherein a leeward side of the at least one vane is defined by front surfaces of the at least two planar panel members and the central ridge is aligned with the central point of the leading edge of the upper vane support member, and
at least two planar side members, each planar side member joined to a side edge of a corresponding planar panel member and extending rearward from the respective planar side member at a second angle, such that a windward side of the at least one vane comprises a recess defined by the planar side members the at least two planar panel members rear surfaces.

10. The windmill turbine of claim 9, wherein the first angle comprises an angle of from about 15 degrees to about 120 degrees.

11. The windmill turbine of claim 10, wherein the first angle is about 90 degrees and the second angle is about 135 degrees.

12. The windmill turbine of claim 10, wherein the first angle is about 45 degrees and the second angle is about 157.5 degrees.

13. The windmill turbine of claim 9, wherein the second angle may have a value of in degrees of about 90 degrees greater than half of the value a total of the first angle subtracted from 180.

14. The windmill turbine of claim 9, further comprising a plurality of vanes in addition to the at least first vane that each extend between a corresponding upper vane support member and a corresponding lower support member.

15. The windmill turbine of claim 9, wherein the at least first lower vane support member has a front edge that tapers from a central apex and aligns with the at least two planar panel members, an outside side edge that aligns with at least one planar side member, and a rear edge that extends between the rear sides of the planar side members.

16. The windmill turbine of claim 14, wherein the plurality of vanes comprises at least three vanes including the first vane.

17. The windmill turbine of claim 9, wherein the central shaft is supported by at least one upper and at least one lower bearing which allows the central shaft to rotate.

18. The windmill turbine of claim 9, further comprising at least one generator operatively connected to the central shaft.

19. The windmill turbine of claim 18, further comprising two generators operatively connected to the central shaft, one at a lower end and the other at an upper end.

\* \* \* \* \*